US008848965B2

(12) United States Patent
Glaser

(10) Patent No.: US 8,848,965 B2
(45) Date of Patent: Sep. 30, 2014

(54) EARBUD CORD ANTI-TANGLING DEVICE

(76) Inventor: Garret W. Glaser, Chicago, IL (US)

( * ) Notice: Subject to any disclaimer, the term of this patent is extended or adjusted under 35 U.S.C. 154(b) by 307 days.

(21) Appl. No.: 13/470,011

(22) Filed: May 11, 2012

(65) Prior Publication Data

US 2013/0301864 A1 Nov. 14, 2013

(51) Int. Cl.

| | |
|---|---|
| ***H04R 25/00*** | (2006.01) |
| ***H04R 1/02*** | (2006.01) |
| ***F16L 3/08*** | (2006.01) |
| ***H04R 1/10*** | (2006.01) |
| *H04R 5/033* | (2006.01) |
| *B65H 75/28* | (2006.01) |

(52) U.S. Cl.

CPC ............ *H04R 1/1033* (2013.01); *H04R 5/0335* (2013.01); *H04R 1/1066* (2013.01); *B65H 75/28* (2013.01)

USPC ........................... 381/374; 381/395; 248/74.3

(58) Field of Classification Search

CPC .... H04R 1/105; H04R 1/1033; H04R 1/1058; H04R 1/1066; H04R 5/0335; H04R 2460/17; H01B 7/40; H01B 7/0045; B65H 75/28; B65H 75/285

USPC ........... 381/74, 374, 380, 383, 384, 385, 395; 248/74, 74.3

See application file for complete search history.

(56) References Cited

U.S. PATENT DOCUMENTS

| | | | | |
|---|---|---|---|---|
| 2008/0245919 | A1* | 10/2008 | Peng et al. | 242/407 |
| 2008/0283164 | A1* | 11/2008 | Noonan | 150/154 |
| 2011/0110552 | A1* | 5/2011 | Pang et al. | 381/374 |
| 2012/0170790 | A1* | 7/2012 | Pang et al. | 381/384 |

* cited by examiner

*Primary Examiner* — Jesse Elbin
(74) *Attorney, Agent, or Firm* — Gardere Wynne Sewell LLP

(57) ABSTRACT

A device for preventing the tangling of cords associated with in-ear earphones is disclosed. The device includes an annular portion and a sectioned membrane disposed interior to the annular portion. The annular portion is formed of an elastomeric material. The sectioned membrane includes a plurality of separate sections where each section is configured to be displaced independently of another section. The sectioned membrane is configured to grip a cord associated with a pair of in-ear earphones.

18 Claims, 3 Drawing Sheets

EARBUD CORD ANTI-TANGLING DEVICE

TECHNICAL FIELD

The present invention relates generally to use and storage of earphones associated with portable media players, and more particularly to a device for preventing tangling of earbud cords.

BACKGROUND

In-ear earphones are often used with portable media devices. Digital portable media devices are practically ubiquitous and many communications devices, such as smartphones, store and play audio content. As such, many people are never without earphones. The earpieces of in-ear earphones are disposed at the ends of right and left earpiece cords. These two cords connect to a plug cord, which connects to a plug that is received by a jack in the portable media player. It can be inconvenient if the two earbud cords become tangled together, and they have to be untangled before the earpieces can be inserted into the ears of the user. In addition, maintaining a position of the earbud cords while the earpieces are in the ears of the user is also desirable, particularly for earphones that include a controller/microphone coupled to one of the earphone cords.

SUMMARY

A device for preventing the tangling of cords associated with in-ear earphones is disclosed. The device includes an annular portion and a sectioned membrane disposed interior to the annular portion. The annular portion is formed of an elastomeric material. The sectioned membrane includes a plurality of separate sections where each section is configured to be displaced independently of other sections. The sectioned membrane is configured to grip a cord associated with a pair of in-ear earphones.

An embodiment of the present disclosure includes a method for preventing tangling of earbud cords using the anti-tangling device. The method includes sliding the anti-tangling device over a plug and along a cord coupled to a pair of earbuds. The anti-tangling device is positioned around the stems of a pair of earbuds to hold the earbuds together. The anti-tangling device may be slid off the stems and down the right and left earbud cords such that it grips the earbud cords together but releases the earpieces to be inserted in the ears of the user.

Technical advantages of the disclosed earbud cord anti-tangling device and method include the ability to use the same anti-tangling device to grip different parts of a pair of earphones, which allows convenient storage and use of the earbuds without the cords becoming tangled.

Other technical advantages will be readily apparent to one of ordinary skill in the art from the following figures, descriptions, and claims. Moreover, while specific advantages have been enumerated above, various embodiments may include all, some, or none of the enumerated advantages.

DETAILED DESCRIPTION OF THE DRAWINGS

Figure 1:
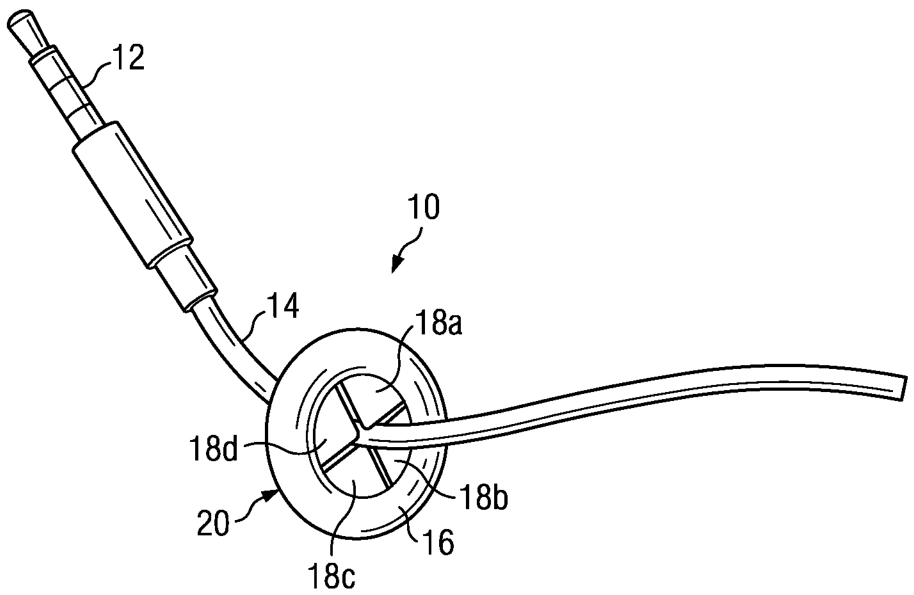
FIG. 1 is an isometric view of an earbud cord anti-tangling device gripping a plug cord according to an embodiment of the present disclosure.

Reference is made to FIG. 1, which shows a device 10 for preventing the tangling of cords of a pair of earphones, for example earbuds. The device 10 may be used in connection with any suitable pair of in-ear earphones to secure cords together and prevent tangling thereof. FIG. 1 shows the anti-tangling device 10 slipped over and beyond a plug 12 and positioned around a plug cord 14. Although not shown, the device 10 is a standalone device that is separate, independent, and removable from the in-ear earphones. The plug 12 may be adapted to fit into a media device. For example, the plug 12 may be received in a portable media device such as an iPod, iPad, iPhone, laptop computer, MP3 player, and any other device that plays audio content including both digital and analog devices.

The anti-tangling device 10 comprises an annular portion 16 and a sectioned membrane 18. The annular portion 16 supports the individual sections 18*a-d* of the sectioned membrane 18. The material of the sectioned membrane 18 is elastic such that it is biased to return to its natural state within the center of the annular portion 16. This elasticity of the sectioned membrane 18 grips the plug cord 14 when the device 10 is slipped over the plug 12 and positioned along the plug cord 14.

The annular portion 16 may be a generally tubular shaped ring approximately the size of a dime or nickel. Both the annular portion 16 and the sectioned membrane 18 may be formed of a soft, deformable elastic material, such as natural or synthetic rubber. Other elastic materials may be used to form the device 10 and/or the annular portion 16 and/or the sectioned membrane 18. A rounded exterior surface 20 of the annular portion 16 provides a surface that may be easily gripped by the user. The user may grip the rounded, exterior surface when applying the device 10 to the cord 14 of the earbuds. Moreover, the flexible material, such as rubber, that the device 10 is made from may provide a tackiness to also aid the user in gripping the device 10 without slippage.

Figure 2:
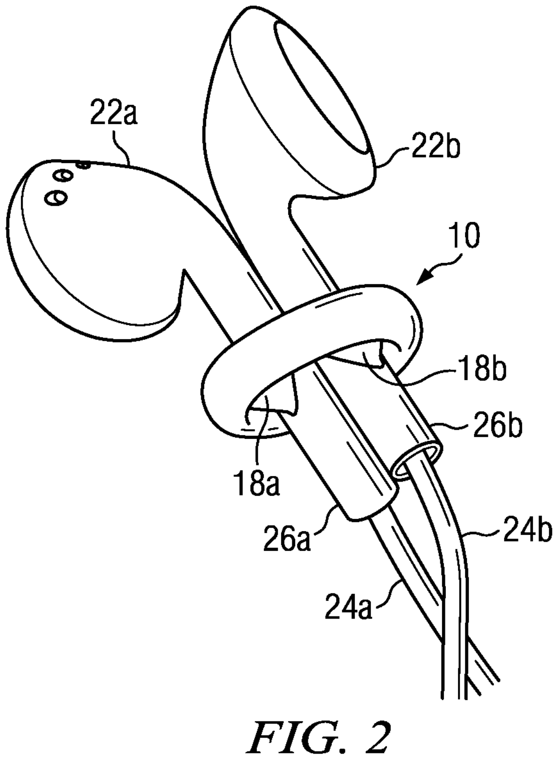
FIG. 2 is an isometric view of an earbud cord anti-tangling device gripping together stems of a pair of earbuds according to an embodiment of the present disclosure.

The sectioned membrane 18 may be a thin piece of rubber that generally extends and fills a circular area defined by the inner surface of the annular portion 16. The sectioned membrane 18 may be thinner than the annular portion 16 and may generally be located in the axial center of the annular portion 16. The membrane 18 is comprised of a plurality of pie-piece-shaped sections 18*a-d*. In the embodiment shown, the sectioned membrane 18 is divided into four approximately equal sections 18*a-d*. The sections 18*a-d* are created by two separations in the membrane 18 that intersect at a center of the membrane 18. Each section 18*a-d* may flex and be displaced independently of the other sections. In addition, the sectioned membrane 18 may be displaced slightly or may be significantly displaced. As such, a slight displacement of the membrane sections 18*a-d* allows the membrane 18 to grip a smaller diameter part of the in-ear earphone, such as the plug cord 14. The sectioned membrane 18 also may be displaced further such that it is substantially displaced in order to accommodate and grip a larger diameter portion of the earphone or accommodate and grip two portions together, as shown in FIG. 2. Thus, the sectioned membrane 18 allows a variety of different portions of the earphone system having a variety of different thicknesses or diameters to be gripped by the same device 10.

Referring to FIG. 2, which shows the device 10 securing together a pair of earbuds 22. Each earpiece or earbud 22*a*, 22*b* receives an audio signal through a respective earbud cord 24*a*, 24*b*. The earbud cords 24 join the respective earbuds 22 at an earbud stem 26*a*, 26*b*. Each earbud cord 24*a*, 24*b* receives its signal from the plug cord 14 (see FIG. 1). The anti-tangling device 10 is positioned around the stems 26 as shown by sliding the device 10 up the plug cord 14 and up the earbud cords 24. By surrounding the stems 26, the device 10 secures the pair of earbuds 22 together.

The sections 18 (only 18*a* and 18*b* are shown) have been displaced by the stems 26. Even though the sections 18*a-d* are displaced and provide some gripping force, additional force to assist in gripping the stems 26 may be provided by the elasticity of the annular portion 16. The displacement of the sections 18*a-d* together with the annular portion 16 grips the stems 26 and secures them together.

Each of the right and left earbuds 22 is an end of a respective earbud cord 24. With the device 10 securing the earbud stems 26 together, the ends of the earbud cords 24 are secured together and unwanted tangling of the earbud cords 24*a*, 24*b* can be prevented. Therefore, when the user desires to use his earbuds 22 to listen to audio content, the user does not have to first untangle the right and left earbud cords 24 before inserting the earbuds 22 in his ears.

Figure 3:
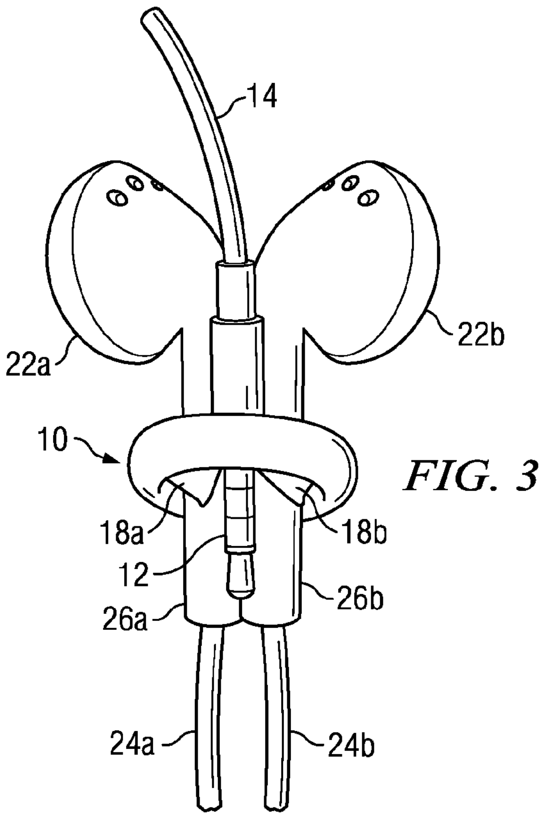
FIG. 3 is an isometric view of an earbud cord anti-tangling device gripping together stems of a pair of earbuds and a plug according to an embodiment of the present disclosure.

Reference is made to FIG. 3, which shows the device 10 securing together a pair of earbuds 22, as shown in FIG. 2, and additionally the device 10 is securing the plug 12 together with the pair of earbuds 22. This may allow a more compact arrangement of the in-ear earphones for storage, while still preventing tangling of the plug cord 14 and the earbud cords 24. In particular, the embodiment shown in FIG. 3 may prevent tangling between the plug cord 14 and the pair of earbud cords 24.

Figure 4:
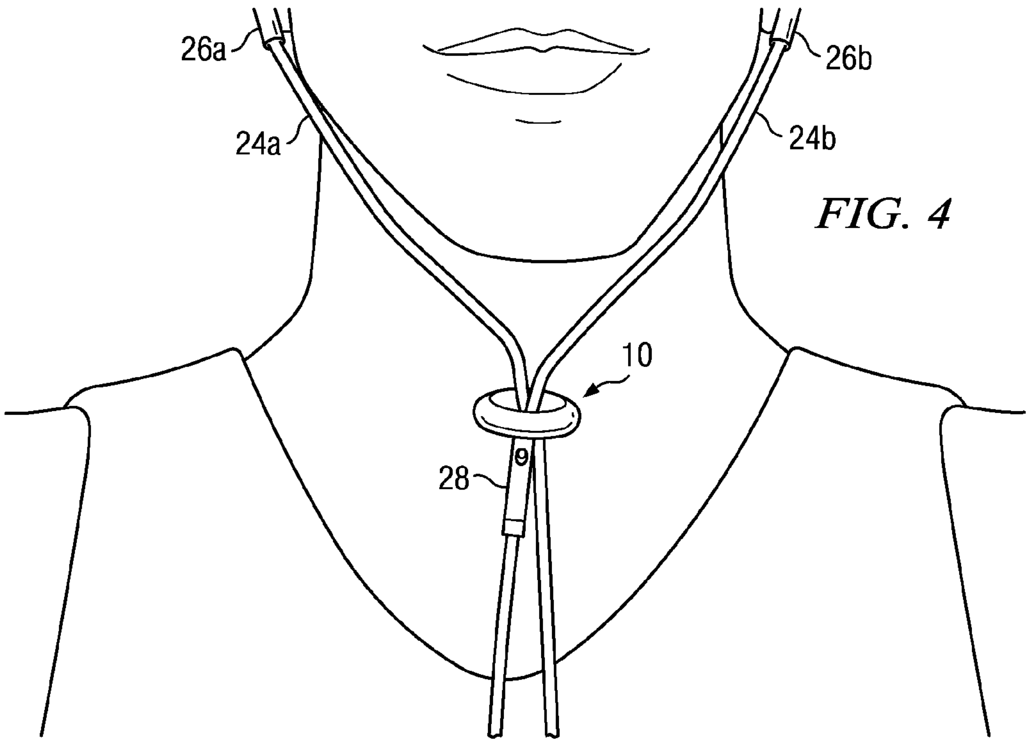
FIG. 4 is an isometric view of an earbud cord anti-tangling device gripping together a pair of earbud cords according to an embodiment of the present disclosure.

Reference is made to FIG. 4, which shows the device 10 positioned along the earbud cords 24. In this manner, the device 10 secures together the portions of the cords 24 that it surrounds. Specifically, the cords 24 are held together by the elasticity of the sectioned membrane 18 (not shown in FIG. 4). According to embodiments of the present disclosure, the device 10 may be slipped from surrounding the earbud stems 22 and slid down the earbud cords 24. As the device 10 is slid down, the ends of the cords 24 are released and the user is able to insert the right and left earbuds 22 into his right and left ear respectively. In this manner, the right and left earbud cords 24 may be held in position even if the user is performing exercise, such as running which may otherwise cause the right and left earbud cords 24 to annoy the user by bouncing around his face and neck.

Some earbuds or in-ear earphones are equipped with a controller/microphone 28. The user may employ the anti-tangling device 10 to aid in positioning the controller/microphone 28 in a desirable location with respect to the face of the user. The controller/microphone 28 may be located along the right or left earbud cord 24. To allow the controller/microphone 28 to clearly receive the speaking voice of the user, the device 10 may maintain the controller/microphone 28 in a position close to the user's mouth. As shown in FIG. 3, the device 10 may help to properly position the controller/microphone 36 more directly below the user's mouth.

The controller 36 may control certain functionality of the audio received by the earbuds 22. For example, the controller 36 may allow the user to adjust the volume. The device 10 assists in maintaining the position of the controller 36 to enable convenient access by the user.

According to embodiments of the present disclosure, the device 10 may be made by forming methods which are well-known in the polymer-forming art. For example, the device 10 may be formed by injection molding or pressure forming the rubber or other synthetic material using a tool having a cavity in the shape of a negative of the device 10. The separation of the membrane 18 into sections 18*a-d* may be performed during forming, or it may be separated after the device is formed.

Figure 5:
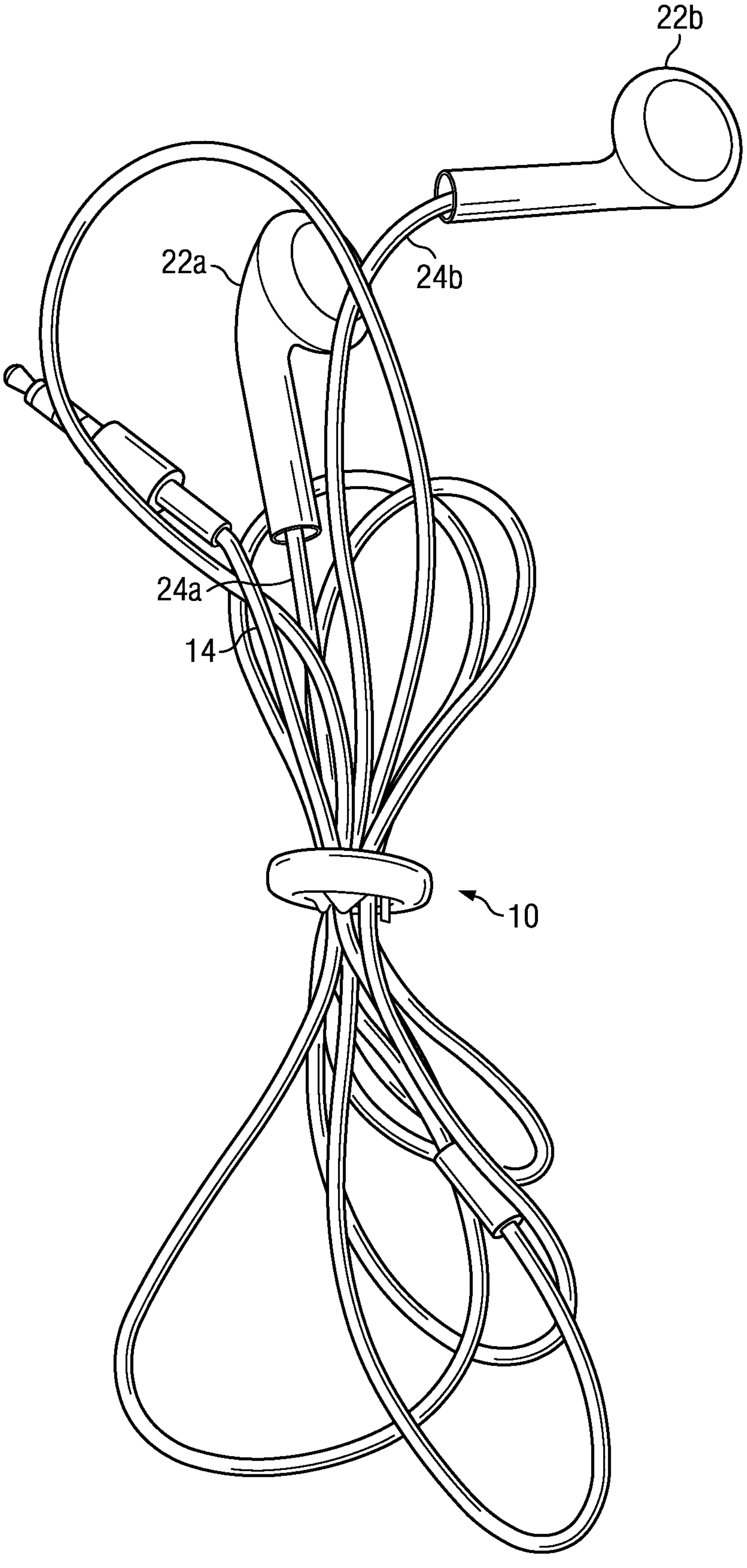
FIG. 5 is an isometric view of an earbud cord anti-tangling device gripping coiled cords associated with a pair of earbuds according to an embodiment of the present disclosure.

Reference is now made to FIG. 5, which shows the device 10 employed to maintain the plug cord 14 and the earbud cords 24 in a coiled position for storage. After the cords 14, 24 are coiled, the device may be slipped over the collection of coils opposite the earbuds 22, which may or may not be opposite the plug 12 depending on how the user coils the cords. The device may then be positioned generally in the middle of the coiled cords 14, 24 to form a bow-like shape where the device secures the collection of coils together at a central portion of the coiled pair of earbuds.

It should be understood that the device 10 may be employed to perform the functions described herein independently. That is, the device 10 may be used to secure earphone cords 24 together as shown in FIG. 4, even if the earphone portion does not include stems suitable for securing together with the device. Similarly, the anti-tangling device may be used to maintain a coiled configuration of the earphone cords for storage, as shown in FIG. 5, even if the pair of earbuds are not suitable for joining the earphones together with the device 10. In addition, more than one device may be used to secure cords and earbuds associated with a single pair of in-ear earphones.

Embodiments of the invention have been described and illustrated above. The invention is not limited to the disclosed embodiments. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

What is claimed is:

1. A cord anti-tangling device, comprising:

an annular portion comprising an elastomeric material;

a sectioned membrane disposed interior to the annular portion and comprising a plurality of separate sections each section configured to be displaced independently of another section, the sectioned membrane configured to grip a cord associated with a pair of in-ear earphones; and wherein the plurality of separate sections comprises four approximately equal sections.

2. The cord anti-tangling device of claim 1 wherein the sectioned membrane comprises the elastomeric material.

3. The cord anti-tangling device of claim 2 wherein an outer diameter of the annular portion is substantially equal to a diameter of a dime.

4. The cord anti-tangling device of claim 1 wherein the elastomeric material is tacky.

5. The cord anti-tangling device of claim 1 wherein an exterior surface of the annular portion is rounded.

6. The cord anti-tangling device of claim 1 wherein the annular portion is configured to be gripped by a user.

7. The cord anti-tangling device of claim 6 wherein the pair of in-ear earphones comprise earbuds.

8. A method of preventing tangling of earbud cords, comprising:

sliding an anti-tangling device over a plug and along a cord coupled to a pair of earbuds, the anti-tangling device comprising an annular portion supporting a sectioned inner membrane having at least four separate sections, the sectioned inner membrane configured to grip the cord; and positioning the anti-tangling device around stems of a pair of earbuds.

9. The method of claim 8, further comprising displacing the at least four separate sections of the sectioned inner membrane with the stems, wherein each of the at least four separate sections are operable to be displaced independently of another section.

10. The method of claim 8, further comprising:

inserting the plug into a portable media player; and sliding the anti-tangling device off the stems and down right and left earbud cords.

11. The method of claim 8, further comprising:

removing the anti-tangling device from the cord and the stems;

coiling the cord, the coiled cord having an earbud end and an opposite looped cord end;

sliding the anti-tangling device over the looped cord end; and positioning the anti-tangling device approximately equidistant from the earbud end and the looped cord end.

12. An earbud cord anti-tangling device, comprising:

an annular portion comprising an elastomeric material, the annular portion having a rounded exterior surface and being configured to be gripped by a user; and a sectioned membrane comprising the same elastomeric material, the sectioned membrane generally extending across and filling an area defined by an interior of the annular portion and comprising a plurality of separate sections, each section configured to be displaced independently of another section, the sectioned membrane configured to grip a cord associated with the pair of earbuds.

13. The earbud cord anti-tangling device of claim 12 wherein a diameter of the annular portion is substantially equal to a diameter of a dime.

14. The earbud cord anti-tangling device of claim 13 wherein the elastomeric material is tacky.

15. The earbud cord anti-tangling device of claim 12 wherein the plurality of separate sections are substantially equal.

16. The earbud cord anti-tangling device of claim 12 wherein the plurality of separate sections include at least four approximately equal sections.

17. An earbud cord anti-tangling device, comprising:

an annular portion comprising an elastomeric material; and a sectioned membrane generally extending across and substantially completely filling an area defined by an interior of the annular portion, the sectioned membrane comprising a plurality of separate sections, each section configured to be displaced independently of another section.

18. A standalone device for inhibiting tangling of cords associated with in-ear earphones and for securing the cords and in-ear earphones together notwithstanding the difference of the respective diameters of the cords and the earphones, the standalone device comprising:

an annular portion adapted to be gripped by a user, the interior surface of the annular portion defining and enclosing an open area;

a sectioned membrane of elastomeric-like material connected at one end at the interior surface and substantially completely filling the open area, the sectioned membrane comprising a plurality of separate pliable sections extending from the interior surface to define a passageway through the annular portion solely at the location of the free ends of the pliable sections, the passageway opening being sufficiently flexible to enable the free ends to respectively grip the different diameter cords and in-ear earphones.

* * * * *